UNITED STATES PATENT OFFICE.

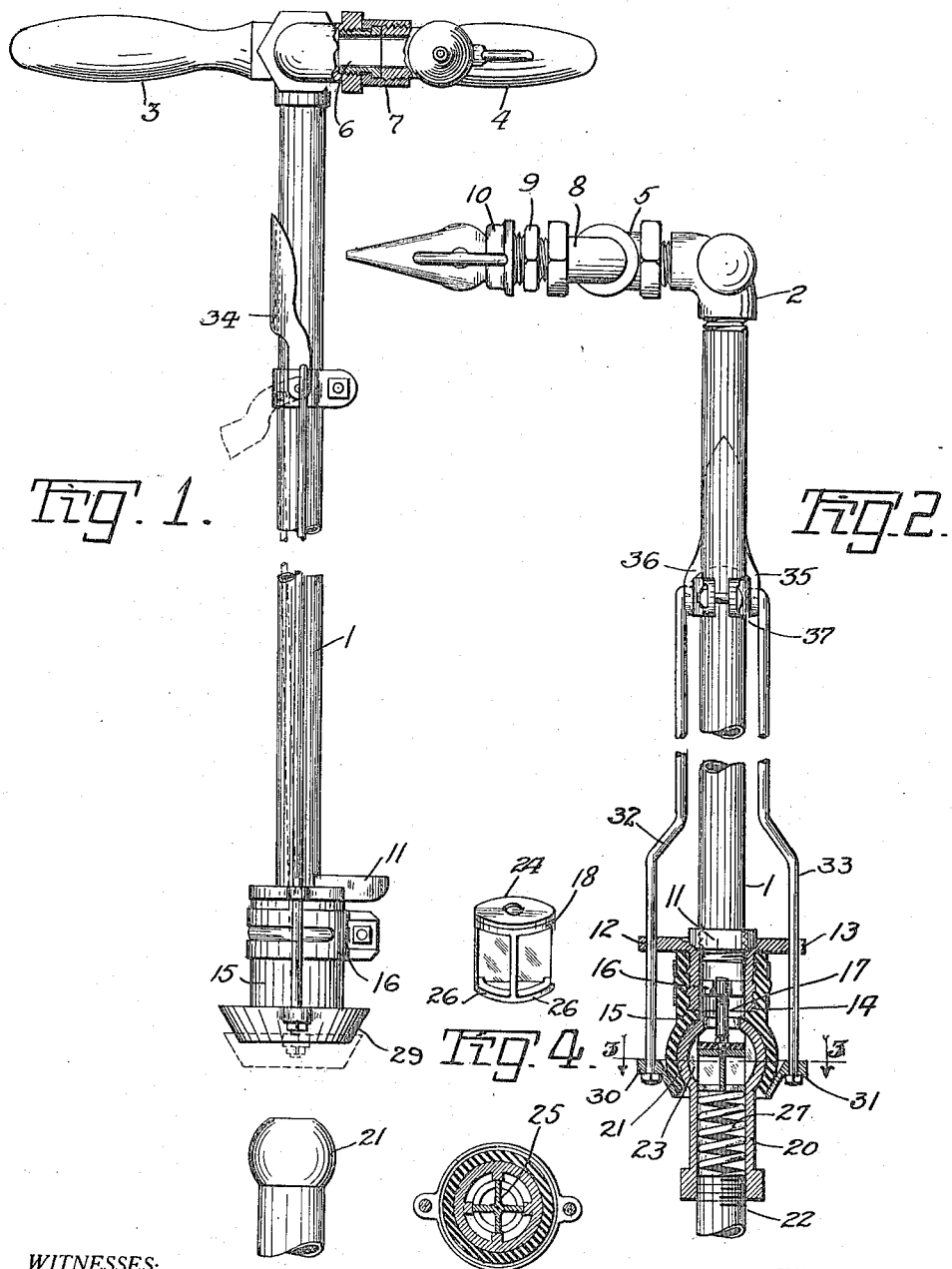

GEORGE R. BOLANDER, OF ALAMEDA, CALIFORNIA.

SPRINKLER.

1,221,276. Specification of Letters Patent. Patented Apr. 3, 1917.

Application filed February 23, 1915, Serial No. 9,876. Renewed November 1, 1916. Serial No. 129,040.

*To all whom it may concern:*

Be it known that I, GEORGE R. BOLANDER, a citizen of the United States, residing at Alameda, in the county of Alameda, State of California, have invented a new and useful Sprinkler, of which the following is a specification in such full and clear terms as will enable those skilled in the art to construct and use the same.

This invention relates to a valve and fixture for irrigating lawns and gardens, or for any similar distribution of water.

An object of the invention is to provide means whereby a covered pipe line will take the place of the ordinary hose, there being such a number of valves as may be required to conveniently cover the place where the water is to be distributed.

Another object of the invention is to dispense with the ordinary garden hose and substitute therefor a short length of rigid pipe having a movable nozzle on the end thereof.

A further object of the invention is to provide a valve of such construction as will enable the water distribution apparatus to be applied thereto in any desired position, the water distribution apparatus being revoluble in a horizontal plane around the valve or applicable thereto in any position it may happen to strike the valve.

An embodiment of the invention is shown in the drawing in which the same reference numeral is applied to the same portion throughout, but I am aware that there are many modifications thereof.

Figure 1 is a view of the device in side elevation showing it in position to be applied to the valve, Fig. 2 is a view in side elevation of the device looking at right angles to Fig. 1, a portion thereof being shown in vertical section and the device secured to the valve, Fig. 3 is a horizontal sectional view on the line 3—3 Fig. 2, and Fig. 4 is a perspective view of the movable part of the valve.

The numeral 1 indicates a convenient length of pipe which has a side outlet T 2 applied to one end thereof, which T carries handles 3 and 4. The T also has an elbow 5 screwed thereinto which is secured to a form of union having a flanged nipple 6 and inwardly flanged sleeve 7 to connect the same with an elbow 8 carrying a nipple 9 and nozzle 10. At the lower end of the pipe 1 there is a flanged fitting having a step portion 11, side ears 12 and 13 and a depending portion 14 to receive the rubber sleeve 15, said sleeve being secured to the fitting by means of the usual hose clamp 16.

The depending portion 14 of the fitting screwed on the lower end of the pipe has a transverse bar 16 into which is screwed a pin 17, which pin is for the purpose of pressing down the valve 18.

The faucet comprises a shell 20 having a spherical head 21 and which faucet is screwed on a pipe 22. The spherical head has ribs 23 therein to permit the water to pass the valve 18 when the valve is open. The valve is cylindrical and carries a gasket 24 and has webs 25 which are connected at their lower ends by means of the members 26 to form a guide for the valve. A spring 27 holds the valve normally seated, the lower end of said spring bearing on the pipe 22.

In order to secure the pipe 1 to the faucet a flaring ring 29 having ears 30 and 31 is used. The ears 31 are connected to the lower ends of rods 32 and 33 which pass through the ears 12 and 13 and which rods are connected at their upper ends to a handle 34.

The handle 34 has side pieces 35 and 36 which are pivoted to the opposite sides of a clamp 37 secured to pipe 1 and the pivot point of the rods 32 and 33 on the handle is arranged so that when the handle has been moved to the position shown in Fig. 1 it will remain in that position because of the tension on the rods. The ring 29 is of such a size as to just pass over the spherical head 21, but it can not pass over said head if the rubber sleeve 15 has been forced thereon.

The operation of the device is as follows: The handles are grasped, the foot is placed on the step 11 and the rubber sleeve is forced over the ball of the faucet, at the same time the pin opens the valve and as soon as the water has begun to issue the device may be locked in place by turning the handle 34 to the position indicated in Fig. 1. To remove the distributing device from the faucet all that is necessary is to release the handle 34, whereupon the water will push it off and at the same time the valve will close.

Having thus described my invention what I claim as new and desire to secure by Letters Patent of the United States, is as fol- lows, modifications within the scope of the claims being expressly reserved:

1. A sprinkler comprising a pipe, a fitting carrying a step secured on the end thereof, a rubber sleeve carried by said fitting, a spherical faucet over which said sleeve is adapted to pass, means carried by the fitting to open a valve in said faucet, and a flaring ring to clamp the rubber sleeve to the faucet when the sprinkler is to be used.

2. In a sprinkler, a pipe, a fitting secured on the end of the pipe, and carrying a pair of ears and a step, a rubber sleeve secured to said fitting, a spherical faucet over which said rubber sleeve is adapted to pass, a flaring ring for pressing the rubber sleeve against the spherical faucet, rods connected with said ring and extending through the ears aforesaid, and a lever connected with the rods for locking the ring and rubber sleeve against the spherical faucet.

In testimony whereof I have hereunto set my hand this 16" day of February A. D. 1915, in the presence of the two subscribed witnesses.

GEORGE R. BOLANDER.

Witnesses:
C. P. GRIFFIN,
HENRY B. LISTER.

Copies of this patent may be obtained for five cents each, by addressing the "Commissioner of Patents, Washington, D. C."